(12) United States Patent
Jeon

(10) Patent No.: US 11,861,189 B2
(45) Date of Patent: Jan. 2, 2024

(54) CALIBRATION APPARATUS AND METHOD FOR DATA COMMUNICATION IN A MEMORY SYSTEM

(71) Applicant: SK hynix Inc., Gyeonggi-do (KR)

(72) Inventor: Duk Joon Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 171 days.

(21) Appl. No.: 17/200,007

(22) Filed: Mar. 12, 2021

(65) Prior Publication Data

US 2022/0113885 A1    Apr. 14, 2022

(30) Foreign Application Priority Data

Oct. 13, 2020   (KR) ........................ 10-2020-0131605

(51) Int. Cl.
    *G06F 3/06*      (2006.01)

(52) U.S. Cl.
    CPC .......... *G06F 3/0631* (2013.01); *G06F 3/0602* (2013.01); *G06F 3/0679* (2013.01)

(58) Field of Classification Search
    CPC .... G06F 3/0602; G06F 3/0605; G06F 3/0631; G06F 3/0634; G06F 3/064; G06F 3/0679
    USPC ................... 711/103, 154, 170, 173
    See application file for complete search history.

(56) References Cited

U.S. PATENT DOCUMENTS

| | | | |
|---|---|---|---|
| 9,348,741 B1* | 5/2016 | Syu | G11C 11/005 |
| 9,772,938 B2* | 9/2017 | Talagala | G06F 3/0656 |
| 9,830,079 B2 | 11/2017 | Kanno | |
| 10,802,739 B1* | 10/2020 | Weber | G06F 3/061 |
| 2013/0173844 A1* | 7/2013 | Chen | G11C 16/349 |
| | | | 711/E12.008 |
| 2014/0006688 A1 | 1/2014 | Yu et al. | |
| 2016/0019137 A1* | 1/2016 | Ellis | G11C 16/10 |
| | | | 711/103 |
| 2016/0092122 A1* | 3/2016 | Agrawal | G06F 3/0616 |
| | | | 711/103 |
| 2016/0313943 A1 | 10/2016 | Hashimoto et al. | |
| 2017/0075594 A1* | 3/2017 | Badam | G11C 16/26 |
| 2017/0351431 A1 | 12/2017 | Dewitt et al. | |
| 2020/0042223 A1* | 2/2020 | Li | G11C 29/52 |
| 2020/0089407 A1 | 3/2020 | Baca et al. | |
| 2020/0167089 A1* | 5/2020 | Natarajan | G11C 16/10 |
| 2020/0393974 A1* | 12/2020 | Bahirat | G06F 3/0685 |
| 2021/0132827 A1* | 5/2021 | Helmick | G06F 3/0679 |
| 2022/0019370 A1* | 1/2022 | Bhardwaj | G06F 3/061 |
| 2022/0050630 A1* | 2/2022 | Bert | G06F 12/10 |
| 2022/0100407 A1* | 3/2022 | Secatch | G06F 3/0673 |

* cited by examiner

*Primary Examiner* — Michael Krofcheck
(74) *Attorney, Agent, or Firm* — IP & T GROUP LLP

(57) ABSTRACT

A memory system includes a memory device including a plurality of memory blocks, each memory block including memory cells capable of storing multi-bit data, and a controller configured to allocate the plurality of memory blocks for plural zoned namespaces input from an external device and access a memory block allocated for one of the plural zoned namespaces which is input along with a data input/output request. In response to a first request input from the external device, the controller adjusts a number of bits of data stored in a memory cell included in a memory block, which is allocated for at least one zoned namespace among the plural zoned namespaces, and fixes a storage capacity of the at least one zoned namespace.

18 Claims, 8 Drawing Sheets

CALIBRATION APPARATUS AND METHOD FOR DATA COMMUNICATION IN A MEMORY SYSTEM

CROSS-REFERENCE TO RELATED APPLICATIONS

This patent application claims the benefit of Korean Patent Application No. 10-2020-0131605, filed on Oct. 13, 2020, the entire disclosure of which is incorporated herein by reference.

TECHNICAL FIELD

One or more embodiments described herein relate to an apparatus and method which performs a calibration operation to control data communication between a controller and a memory device including plural non-volatile memory cells.

BACKGROUND

Recently, a paradigm for a computing environment has shifted to ubiquitous computing, which enables computer systems to be accessed virtually anytime and anywhere. As a result, the use of portable electronic devices (e.g., mobile phones, digital cameras, notebook computers) is rapidly increasing Such portable electronic devices may use or include a memory system having at least one memory device, e.g., a data storage device. The data storage device can be used as a main storage device or an auxiliary storage device of a portable electronic device.

Unlike a hard disk, data storage devices that use non-volatile semiconductor memories exhibit improved stability and durability, have no mechanical driving parts (e.g., a mechanical arm), and perform with high data access speeds and relatively low power consumption. Examples of these types of data storage devices include, but are not limited to, Universal Serial Bus (USB) memory devices, memory cards having various interfaces, and solid state drives (SSDs).

BRIEF DESCRIPTION OF THE DRAWINGS

The description herein makes reference to the accompanying drawings wherein like reference numerals refer to like parts throughout the figures.

DETAILED DESCRIPTION

Figure 1:
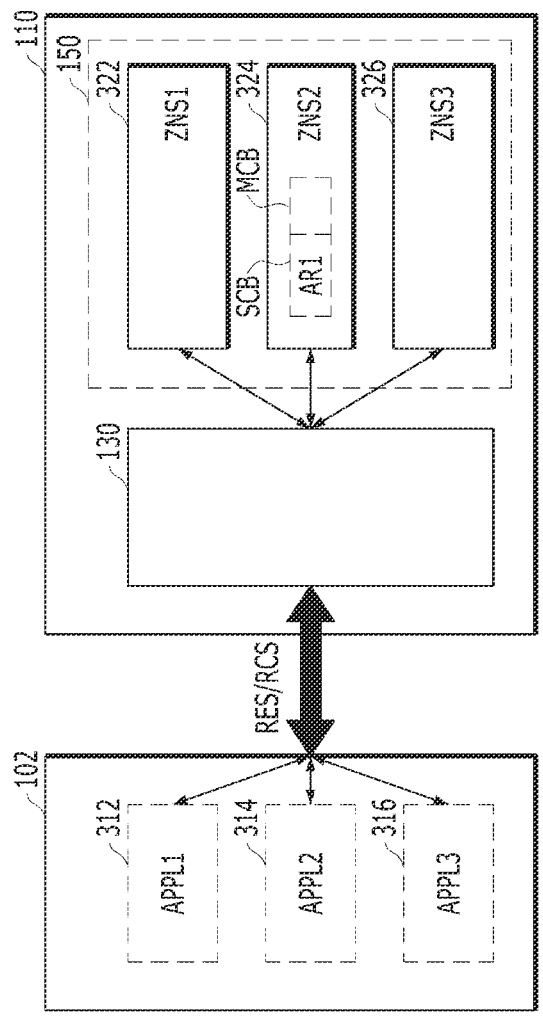
FIG. 1 illustrates a data processing system according to an embodiment of the present disclosure.

Various embodiments of the present disclosure are described below with reference to the accompanying drawings. Elements and features of the present disclosure, however, may be configured or arranged differently to form other embodiments, which may be variations of any of the disclosed embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.)

in this disclosure, references to various features (e.g., dements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' may refer to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data or a data item may be a sequence of bits. For example, the data item may include the contents of a file, a portion of the file, a page in memory, an object in an object-oriented program, a digital message, a digital scanned image, a part of a video or audio signal, or any other entity which can be represented by a sequence of bits. According to an embodiment, the data item may include a discrete object. According to another embodiment, the data item may include a unit of information within a transmission packet between two different components.

An embodiment of the disclosure can provide a data processing system and a method for operating the data processing system, which includes components and resources such as a memory system and a host, and is capable of dynamically allocating plural data paths used for data communication between the components based on usages of the components and the resources.

A memory system according to an embodiment of the present disclosure can support a zoned namespace (ZNS) command set and include a zoned storage device interface allowing a non-volatile memory device and a host to collaborate on data placement, such that data can be aligned to a physical media of the non-volatile memory device, improving an overall performance of the memory system and increasing a capacity that can be exposed to the host. Even while a data input/output operation is performed within the non-volatile memory device, an apparatus or a method can make the memory system adjust the number of bits of data stored in a non-volatile memory cell included in a memory block allocated for a specific zone, in response to host's request.

In addition, in a memory system according to an embodiment of the present disclosure, a namespace divided into plural zones can be established during an initial operation for performing a data input/output operation, after being connected to a host, based on a characteristic of data stored in the non-volatile memory device. The embodiment can provide an apparatus and method capable of improving data input/output operation performance and improving durability of the non-volatile memory device, because the namespace can be changed or adjusted in response to the characteristic of data.

Further, a memory system according to an embodiment of the present disclosure can overcome the limitation of operation according to an initial setting value in a non-volatile memory device that supports a namespace divided by plural zones, so increasing availability of the non-volatile memory device.

In an embodiment of the present disclosure, a memory system can include a memory device including a plurality of memory blocks, each memory block including memory cells capable of storing multi-bit data; and a controller configured to allocate the plurality of memory blocks for plural zoned namespaces input from an external device and access a memory block allocated for one of the plural zoned namespaces, which is input along with a data input/output request. In response to a first request input from the external device, the controller can adjust a number of bits of data stored in a memory cell included in a memory block, which is allocated for at least one zoned namespace among the plural zoned namespaces, and fix a storage capacity of the at least one zoned namespace.

The controller can be configured to, when the plurality of memory blocks allocated for the plural zoned namespaces includes memory cells storing n-bit data, adjust the plurality of memory blocks to store 1-bit data in each of the memory cells included therein and deactivate (n−1) zoned namespaces among the plural zoned namespaces, wherein the n is an integer greater than 1.

The controller can be configured to, when the first request is input along with a specific zoned namespace among the plural zoned namespaces, adjust at least one memory block allocated for the specific zoned namespace to store 1-bit data in each of memory cells in the at least one memory block and deactivate at least one zoned namespace other than the specific zoned namespace among the plural zoned namespaces to fix a storage capacity of the specific zoned namespace.

The controller can be further configured to, in response to a second request input from the external device, adjust the at least one memory block storing the 1-bit data in each of memory cells to store the mufti-bit data therein.

The controller can be configured to, in response to the second request, activate the at least one zoned namespace previously deactivated to store data.

The first request can be associated with a characteristic of data stored in the memory device via the at least one zoned namespace of the plural zoned namespaces.

The first request can be associated with a memory block storing data which has a shorter update period than, or is more frequently read than, other data stored in other memory blocks allocated for other zoned namespaces.

The controller can be further configured to perform garbage collection to at least one memory block among the plurality of memory blocks and release zoned namespace allocation of the at least one memory block when the at least one memory block is erased.

The controller can be further configured to transmit, to the external device, a result of the adjusting of the number of bits of data stored in the memory cell included in the memory block allocated for the at least one zoned namespace.

In another embodiment of the present disclosure, a method for operating a memory system can include allocating a plurality of memory blocks, each memory block including memory cells capable of storing multi-bit data, for plural zoned namespaces input from an external device; accessing a memory block allocated for one of the plural zoned namespaces, which is input along with a data input/ output request; and adjusting a number of bits of data stored in a memory cell included in a memory block, which is allocated for at least one zoned namespace among the plural zoned namespaces and fixing a storage capacity of the at least one zoned namespace, in response to a first request input from the external device.

The adjusting of the number of bits of data can include, when the plurality of memory blocks allocated for the plural zoned namespaces includes memory cells storing n-bit data, in response to the first request, adjusting the plurality of memory blocks to store 1-bit data in each of the memory cells included therein; and deactivating (n−1) zoned namespaces among the plural zoned namespaces. Herein, the n is an integer greater than 1.

The adjusting of the number of bits of data can include, when the first request is input along with a specific zoned namespace among the plural zoned namespaces, adjusting at least one memory block allocated for the specific zoned namespace to store 1-bit data in each of memory cells in the at least one memory block; and deactivating at least one zoned namespace other than the specific zoned namespace among the plural zoned namespaces to fix a storage capacity of the specific zoned namespace.

The method can further include adjusting, in response to a second request input from the external device, the at least one memory block storing the 1-bit data in each of memory cells to store the mufti-bit data therein.

The method can further include activating, in response to the second request, the at least one zoned namespace previously deactivated to store data.

The first request can be associated with a characteristic of data stored in the memory device via the at least one zoned namespace of the plural zoned namespaces.

The first request can be associated with a memory block storing data which has a shorter update period than, or is more frequently read than, other data stored in other memory blocks.

The method can further include performing garbage collection to at least one memory block among the plurality of memory blocks; and releasing zoned namespace allocation of the at least one memory block when the at least one memory block is erased.

The method can further include transmitting, to the external device, a result of the adjusting of the number of bits of data stored in the memory cell included in the memory block.

In another embodiment of the present disclosure, a memory system can include a memory device including a plurality of memory blocks, each memory block including memory cells capable of storing multi-bit data; and a controller configured to allocate the plurality of memory blocks for plural zoned namespaces input from an external device, access a memory block allocated for one of the plural zoned namespaces, which is input along with a data input/output request, adjust, in response to a first request, a number of bits of data stored in a memory cell included in a memory block, which is allocated for at least one zoned namespace among the plural zoned namespaces and fix a storage capacity of the at least one zoned namespace.

The controller can be configured to deactivate at least one zoned namespace other than the at least one zoned namespace among the plural zoned namespaces to fix or maintain a storage capacity of the at least one zoned namespace corresponding to the first request.

In another embodiment, a memory system can include a memory device including first and second groups of memory blocks each having memory cells each capable of having any of first and second cell storage capacities, each group having a predetermined group storage capacity due to a predetermined one of the first and second cell storage capacities; and a controller configured to change, between the first and second cell storage capacities, a cell storage capacity of the memory cells within the respective first and second groups while keeping the predetermined group storage capacity of the first group by incorporating, into the first group, one or more of the memory blocks within the second group.

In another embodiment, a memory system can include a memory device including a group of memory blocks having memory cells each capable of having any of first and second cell storage capacities, the group having a predetermined group storage capacity due to a predetermined one of the first and second cell storage capacities; and a controller configured to change, between the first and second cell storage capacities, a cell storage capacity of the memory cells within the group while keeping the predetermined group storage capacity of the group by incorporating, into another group within the memory device, one or more of the memory blocks within the group.

Embodiments of the present disclosure will now be described with reference to the accompanying drawings, wherein like numbers reference like elements.

FIG. 1 illustrates a data processing system according to an embodiment of the present disclosure.

Referring to FIG. 1, a memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

Although now shown in FIG. 1, the memory device 150 may include a memory die. The memory die may include a plurality of memory blocks. The memory block may be understood as a group of non-volatile memory cells in which data is removed together by a single erase operation. Although not illustrated, the memory block may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange a piece of data and a signal with the controller 130.

According to an embodiment, the memory device 150 may include at least one memory block, at least one memory plane, or at least one memory die. The internal configuration of the memory device 150 shown in FIG. 1 may be different according to performance of the memory system 110. An embodiment of the present disclosure is not limited to the internal configuration shown in FIG. 1.

Referring to FIG. 1, the memory device 150 may include a voltage supply circuit capable of supplying at least some voltage into the memory block. The voltage supply circuit may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block, the voltage supply circuit may supply the read voltage Vrd into a selected non-volatile memory cell. During the program operation for storing data in the non-volatile memory cell included in the memory block, the voltage supply circuit may supply the program voltage Vprog into a selected non-volatile memory cell. Also, during a read operation or a program operation performed on the selected nonvolatile memory cell, the voltage supply circuit may supply a pass voltage Vpass into a non-selected nonvolatile memory cell. During the erasing operation for erasing data stored in the non-volatile memory cell included in the memory block, the voltage supply circuit may supply the erase voltage Vers into the memory block.

The memory device 150 may store information regarding various voltages which are supplied to the memory block 60 based on which operation is performed. For example, when a non-volatile memory cell in the memory block can store multi-bit data, plural levels of the read voltage Vrd for recognizing or reading the multi-bit data may be required. The memory device 150 may include a table including information corresponding to plural levels of the read voltage Vrd, corresponding to the mufti-bit data. For example, the table can include bias values stored in a register, each bias value corresponding to a specific level of the read voltage Vrd. The number of bias values for the read voltage Vrd that is used for a read operation may be limited to a preset range. Also, the bias values can be quantized.

At least some of the plurality of memory blocks included in the memory device 150 can be allocated for a namespace divided into plural zones, hereinafter, referred to as zoned namespaces (ZNSs). According to an embodiment, the controller 130 may evenly allocate all memory blocks included in the memory device 150 for respective ZNSs. In this case, plural memory blocks allocated for a specific ZNS can include a memory block storing data therein (such as an open block or closed block) and an empty memory block not storing any data therein (such as a free block).

According to an embodiment, the controller 130 may allocate, for a ZNS, at least some of the memory blocks included in the memory device 150, the at least some memory blocks corresponding to a storage capacity required by the ZNS. Herein, the storage capacity may refer to how much storage space the memory device 150 provides. A memory block allocated for a specific ZNS can be released according to garbage collection, and another free block can be newly allocated for the specific ZNS. Or, when the specific ZNS is deactivated, the at least some memory blocks of the deactivated ZNS may become unallocated for any ZNS. The controller 130 may allocate the unallocated memory block for a specific ZNS additionally, as needed, while performing an input/output operation or receiving a request input from an external device.

The ZNS may refer to a scheme of using a namespace divided by plural zones. Herein, the namespace may be considered as a logical storage space which is formattable within the memory device 150. The namespace may have a preset or adjustable storage capacity. When the ZNS is applicable to the memory system 110, data input/output operations may be performed differently from a conventional non-volatile memory system which does not support a scheme of the ZNS.

For example, the host 102 can execute a plurality of applications APPL1, APPL2, APPL3, and the plurality of applications APPL1, APPL2, APPL3 can generate data items, individually, and store the generated data items in the memory system 110.

First, in the conventional non-volatile memory system, data items input from a host 102 are sequentially stored in a memory block within the memory device. That is, data items generated by the plurality of applications APPL1, APPL2, APPL3 may be sequentially stored in the memory device, without separation or distinction, according to an order of the data items which have been transferred from the host 102 to the conventional non-volatile memory system. The data items generated by the plurality of applications APPL1, APPL2, APPL3 may be sequentially stored in a memory block opened for programming data within the memory device. In the memory block, the data items generated by the plurality of applications APPL1, APPL2, APPL3 can be mixed or jumbled. In these processes, the controller is configured to generate map data items, each associating a logical address input from the host 102 with a physical address indicating a location where data is stored in the memory device. Thereafter, when the plurality of applications APPL1, APPL2, APPL3 executed by the host 102 requests data items stored in the memory system, the controller can output the data items requested by the plurality of applications APPL1, APPL2, APPL3 based on the map data items.

In the conventional non-volatile memory system, various types of data items generated by various applications may be mixed or jumbled in a single memory block. In this case, data items stored in the single memory block (valid data is the latest data) can have different validity, and it may be difficult to predict validity of data items. Due to this reason, when garbage collection is performed, a lot of resources may be consumed to select a valid data item or to check whether the data items are valid. In addition, because plural applications are associated with a single memory block, a data input/output operation requested by one of the plural applications may be delayed by another operation requested or caused by another application. When garbage collection is performed on the memory block, plural operations requested by the plural applications may be delayed. However, the ZNS can avoid or prevent above-described issues which occur in the conventional non-volatile memory system.

In a scheme of the ZNS, the plurality of applications APPL1, APPL2, APPL3 may sequentially store data items in respectively assigned zoned namespaces ZNS1, ZNS2, ZNS3. Here, the zone may have a predetermined storage space corresponding to a logical address scheme used by the host 102. Plural memory blocks included in the memory device 150 may be allocated for individual zones. Referring to FIG. 1, the plurality of zoned namespaces ZNS1, ZNS2, ZNS3 can correspond to the plurality of applications APPL1, APPL2, APPL3 included in the memory device 150. A data item associated with the first application (APPL1, 312) can be programmed in, or read from, a memory block allocated for the first zoned namespace (ZNS1, 322). The second application (APPL2, 314) can store a data item in, or read a data item from, another memory block allocated for the second zoned namespace (ZNS2, 324). In addition, the third applications (APPL3, 316) may store a data item in, or read a data item from, another memory block allocated for the third zoned namespace (ZNS3, 326).

In this case, data items generated by the first application APPL1 are sequentially stored in a memory block allocated for the first zoned namespace ZNS1, so that the memory system 110 does not have to check another memory block allocated for ZNSs other than first zoned namespace ZNS1 among the plurality of zoned namespaces ZNS1, ZNS2, ZNS3 for performing a data input/output operation or garbage collection. In addition, until a storage space in the first zoned namespace ZNS1 allocated to the first application APPL1 becomes insufficient to store data, garbage collection need not be performed on the memory blocks allocated for the first zoned namespace ZNS1. For this reason, efficiency of garbage collection for the memory device 150 may increase, and a frequency of performing the garbage collection may decrease. This can lead to a decrease in a write amplification factor (WAF) indicating a degree to which an amount of data write (or data program) is amplified in the memory device 150, and increase a lifespan of the memory device 150. In addition, in the memory system 110 to which the ZNS is applied, media over-provisioning in the memory device 150 can be reduced, as well as a utilization (or occupancy) rate of the volatile memory 144 (refer to FIGS. 2 to 3) can be reduced. It is possible to reduce the amount of data processed, transmitted, or received within the memory system 110, so that overheads generated in the memory system 110 might decrease. Through this, performance of the data input/output operation of the memory system 110 may be improved or enhanced.

According to an embodiment, the plurality of zoned namespaces ZNS1, ZNS2, ZNS3 may be individually allocated for each of the plurality of applications APPL1, APPL2, APPL3. In another embodiment, the plurality of applications APPL1, APPL2, APPL3 may share a specific ZNS. In addition, in another embodiment, plural ZNSs are allocated for each of a plurality of applications APPL1, APPL2, APPL3. Each of the applications APPL1, APPL2, APPL3 can use the plural ZNSs according to characteristics of data to be stored in the memory system 110. For example, when the first zoned namespace ZNS1 and the second zoned namespace ZNS2 are allocated for the first application APPL1, the first application APPL1 can store a hot data item (e.g., a data item frequently accessed or read, or updated) in the first zoned namespace ZNS1, and store a cold data item (e.g., a data item less frequently accessed or read, or updated) in the second zoned namespace ZNS2. The hot data item is more frequently read, updated or re-programmed than the cold data item, so that a validity period of the host data item is shorter than that of the cold data item.

During an initial operation for engagement between the host 102 and the memory system 110, the host 102 and the memory system 110 may exchange information regarding ZNSs allocated for the respective applications APPL1, APPL2, APPL3. A data input/output operation may be performed for each of the applications APPL1, APPL2, APPL3 through a corresponding ZNS. Depending on the characteristics of data during the data input/output operation or the characteristics of applications, the host 102 can require a faster data input/output speed of the memory system 110, or securely store a data item with a very high priority in the memory system 110.

Furthermore, a plurality of non-volatile memory cells included in the memory device 150 may include memory cells, each memory cell storing mufti-bit data. But the memory system 110 can adjust the memory cell to store one-bit data. When a fast input/output speed is required or data should be safely stored, the memory system 110 may adjust a memory block including memory cells to store one-bit data in each memory cell although the memory cells are capable of storing multi-bit data. Further, if necessary, a specific memory block in the memory device 150 may be used as a single-level cell (SLC) buffer for a fast data input/output operation or data safety. Sometimes, the memory system 110 can adjust the number of bits of data stored in the memory cell for wear leveling. Due to various reasons, after the host 102 and the memory system 110 set the ZNS and exchange information regarding the set ZNS with each other, the memory system 110 might independently change the number of bits of data stored in the memory cell included in the memory block allocated for the ZNS. However, it could be issue that a preset storage capacity of the ZNS would be changed when the number of bits of data stored in the memory cell included in the memory block allocated for the already set ZNS is changed.

Referring to FIG. 1, the host 102 can send a first request RES to the memory system 110 to change the number of bits of data stored in a non-volatile memory cell in a memory block allocated for the ZNS. For example, when the host 102 transmits the first request RES in relation to the second zoned namespace ZNS2 to the memory system 110, the memory system 110 can adjust a memory block AR1 allocated for the second zoned namespace ZNS2 to store single-bit data in each memory cell included in the memory block AR1. That is, the memory block AR1 can be adjusted from a multi-level cell memory block (MLC) including memory cells capable of storing multi-bit data to a single-level cell memory block (SLC) including memory cells capable of storing single-bit data. Further, when the host 102 transmits a second request RCS in relation to the second zoned namespace ZNS2 to the memory system 110, the memory system 110 can adjust the memory block AR1 allocated for the second zoned namespace ZNS2 to store multi-bit data in each memory cell included in the memory block AR1. That is, the memory block AR1 can be adjusted from the single-level cell (SLC) memory block including memory cells capable of storing one-bit data to the multi-level cell (MLC) memory block including memory cells capable of storing multi-bit data.

During these operations, the memory system 110 may fix or maintain a storage capacity of the second zoned namespace ZNS2 even when the number of bits of data stored in the memory cell included in the memory block is adjusted. The memory system 110 may deactivate another ZNS not to be used by the host 102, so that the memory system 110 could release memory blocks allocated for the deactivated ZNS and re-allocate released memory block for the second zoned namespace ZNS2. The memory system 110 may adjust the number of bits of data that can be stored in the non-volatile memory cell in the memory block and then notify an adjusted result to the host 102.

According to an embodiment, the first and second requests RES, RCS transmitted from the host 102 can be generated while the plurality of applications APPL1, APPL2, APPL3 are running (e.g., a fast operation speed is requested or data having a priority is generated). In addition, in another embodiment, when a deteriorated operation state of a specific memory block in the memory device 150 is recognized due to a background operation such as bad block management, garbage collection or wear leveling performed in the memory system 110, the memory system 110 may transmit relevant information to the host 102 for inducing a change in a storage space in the ZNS associated with the specific memory block. For example, when an operation state of the memory block AR1 allocated for the second zoned namespace ZNS2 reaches a preset lifetime (e.g., P/E cycle) for storing mufti-bit data (e.g., TLC block, QLC block, etc.), the memory system 110 may transmit information regarding the second zoned namespace ZNS2 associated with the memory block AR1 to the host 102 for a purpose of adjusting the memory block AR1 to store one-bit data in memory cells (e.g., the memory block AR1 is adjusted into a SLC block). Through this operation, the lifespan of the memory device 150 can be longer.

Figure 2:
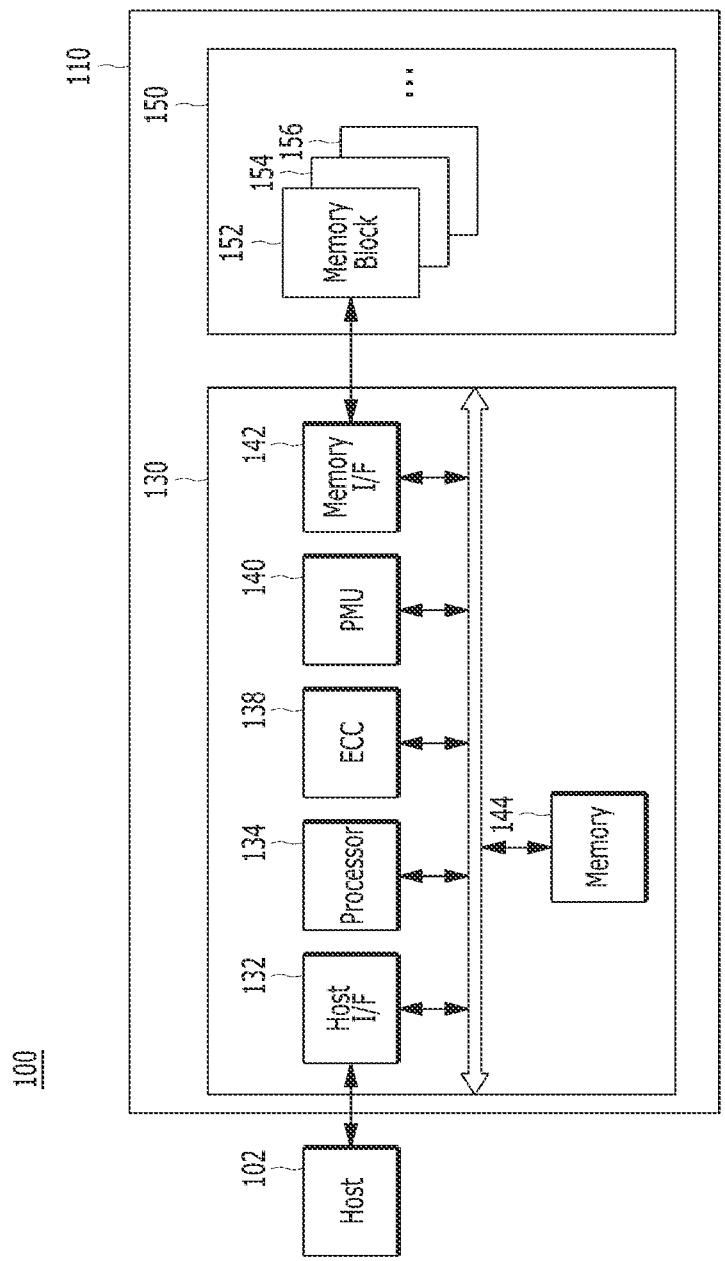
FIG. 2 illustrates a data processing system according to an embodiment of the present disclosure.
Figure 3:
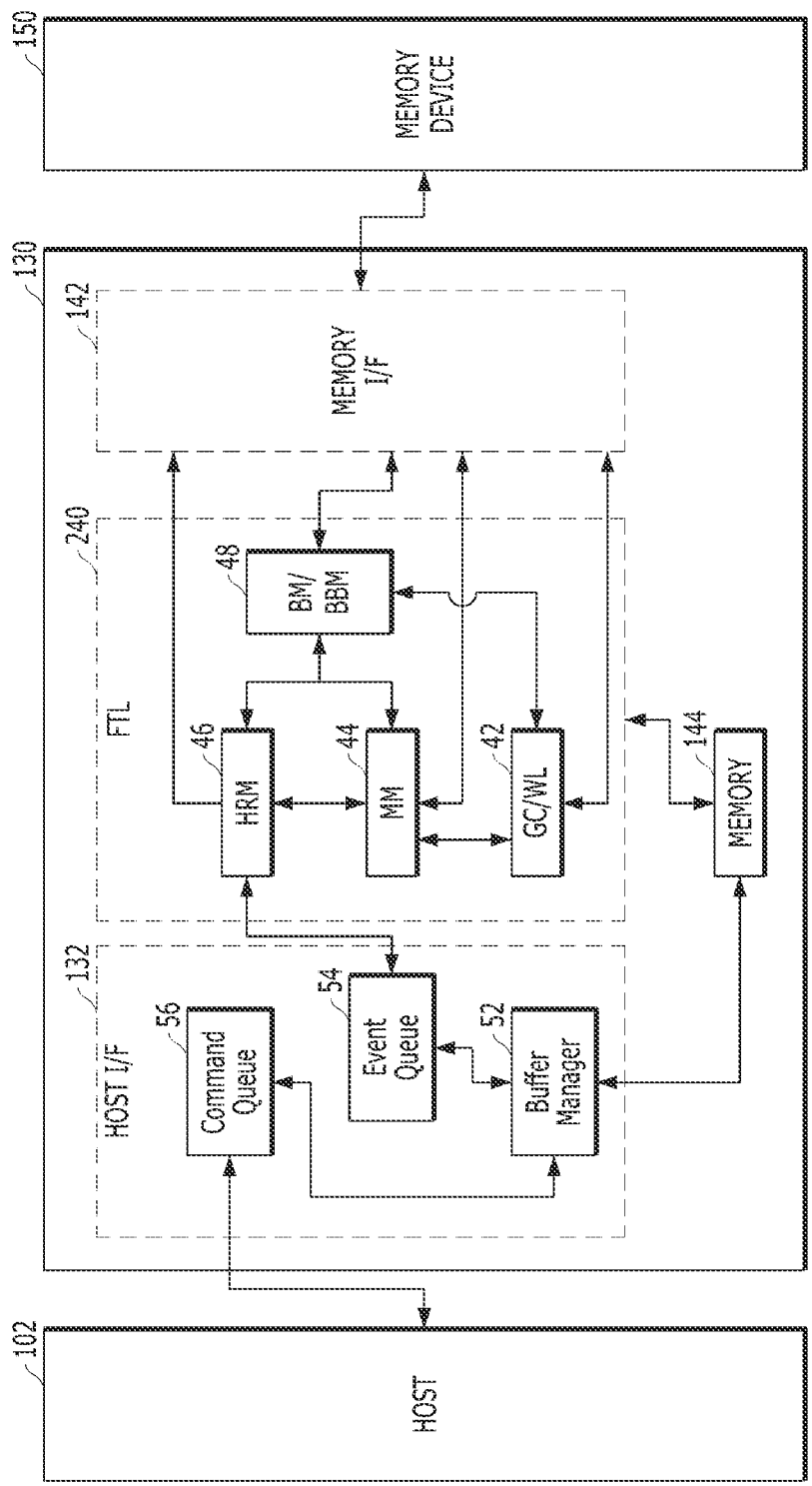
FIG. 3 illustrates a memory system according to an embodiment of the present disclosure.

FIGS. 2 and 3 illustrate some operations that may be performed by the memory system 110 according to one or more embodiments of the present disclosure.

Referring to FIG. 2, a data processing system 100 may include a host 102 engaged or coupled with a memory system, such as memory system 110. The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and the user who intends to store data in the memory system 110. The OS may support functions and operations corresponding to user requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command input from the host 102. For example, the controller 130 may perform a read operation to provide a piece of data read from the memory device 150 for the host 102 and may perform a write operation (or a program operation) to store a piece of data input from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMIS) 140, a memory interface 142, and a memory 144. Regarding the memory system 110, the components included in the controller 130 as illustrated in FIG. 2 may vary according to structure, function, operation performance, or the like, among various embodiments. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components in the controller 130 may be added or omitted based on implementation of the memory system 110.

The host 102 and the memory system 110 may include a controller or an interface for transmitting and receiving signals, a piece of data, and the like, in accordance with one or more predetermined protocols. For example, the host interface 132 in the memory system 110 may include an apparatus capable of transmitting signals, a piece of data, and the like, to the host 102 or receiving signals, a piece of data, and the like input from the host 102.

The host interface 132 included in the controller 130 may receive signals, commands (or requests), and/or a piece of data input from the host 102. For example, the host 102 and the memory system 110 may use a predetermined protocol to transmit and receive a piece of data between each other. Examples of protocols or interfaces supported by the host 102 and the memory system 110 for sending and receiving a piece of data include Universal Serial Bus (USB), Multi-Media Card (MMC), Parallel Advanced Technology Attachment (DATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIDI), and the like. According to an embodiment, the host interface 132 is a type of layer for exchanging a piece of data with the host 102 and is implemented with, or driven by, firmware called a host interface layer (HIL).

The Integrated Drive Electronics (IDE) or Advanced Technology Attachment (ATA) may be used as one of the interfaces for transmitting and receiving a piece of data and, for example, may use a cable including 40 wires connected in parallel to support data transmission and reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as the main memory device. The IDE (ATA) may include, for example, Fast-ATA, ATAPI, and Enhanced IDE (EIDE).

Serial Advanced Technology Attachment (SATA) is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for SATA to be transmitted between each other. The SATA has been widely used because of its faster data transmission and reception rate, and its less resource consumption in the host 102 used for data transmission and reception, SATA may support connections with up to 30 external devices to a single transceiver included in the host 102. In addition, SATA can support hot plugging that allows an external device to be attached or detached from the host 102, even while data communication between the host 102 and another device is being executed. Thus, the memory system 110 can be connected or disconnected as an additional device, like a device supported by a Universal Serial Bus (USB) even when the host 102 is powered on. For example, in the host 102 having an eSATA port, the memory system 110 may be freely detached like an external hard disk.

Small Computer System Interface (SCSI) is a type of serial data communication interface used for connection between a computer, a server, and/or other peripheral devices. The SCSI can provide a high transmission speed, as compared with other interfaces such as IDE and SATA. In SCSI, the host 102 and at least one peripheral device (e.g., memory system 110) are connected in series, but data transmission and reception between the host 102 and each peripheral device may be performed through a parallel data communication. In SCSI, it is easy to connect to, or disconnect from, the host 102, a device such as the memory system 110. SCSI can support connections of 15 other devices to a single transceiver included in host 102.

Serial Attached SCSI (SAS) can be understood as a serial data communication version of the SCSI. In SAS, not only the host 102 and a plurality of peripheral devices are connected in series, but also data transmission and reception between the host 102 and each peripheral device may be performed in a serial data communication scheme. SAS can support connection between the host 102 and the peripheral device through a serial cable instead of a parallel cable, to easily manage equipment using SAS and enhance or improve operational reliability and communication performance. SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. PCIe can use a slot or a specific cable for connecting the host 102 (e.g., a computing device) and the memory system 110 (e.g., a peripheral device). For example, PCIe can use a plurality of pins (for example, 18 pins, 32 pins, 49 pins, 82 pins, etc.) and at least one wire (e.g., x1, x4, x8, x16, etc.) to achieve high speed data communication over several hundred MB per second (e.g., 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and a peripheral device, such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of the data to be processed in (e.g., output from) the memory device 150, which may include an error correction code (ECC) encoder and an ECC decoder. The ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150. For example, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use a parity bit generated during the ECC encoding process for correcting the error bit of the read data. When the number of the error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include all circuits, modules, systems, and/or devices for performing the error correction operation based on at least one of the above described codes.

For example, the ECC decoder may perform hard decision decoding or soft decision decoding to data transmitted from the memory device 150. The hard decision decoding can be understood as one of two methods broadly classified for error correction. Hard decision decoding may include an operation of correcting an error by reading digital data of '0' or '1' from a non-volatile memory cell in the memory device 150. Because the hard decision decoding handles a binary logic signal, the circuit/algorithm design or configuration may be simpler and processing speed may be faster than soft decision decoding.

Soft decision decoding may quantize a threshold voltage of a non-volatile memory cell in the memory device 150 by two or more quantized values (e.g., multiple bit data, approximate values, an analog value, and the like) in order to correct an error based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and a generator matrix (LDPC-GM) code among methods designed for the soft decision decoding. The low-density parity-check (LDPC) code uses an algorithm that can read values of data from the memory device 150 in several bits according to reliability, not simply data of 1 or 0 like hard decision decoding, and iteratively repeats it through a message exchange in order to improve reliability of the values. Then, the values are finally determined as data of 1 or 0. For example, a decoding algorithm using LDPC codes can be understood as probabilistic decoding. Hard decision decoding in which the value output from a non-volatile memory cell is coded as 0 or 1. Compared to hard decision decoding, soft decision decoding can determine the value stored in the non-volatile memory cell based on the stochastic information. Regarding bit-flipping (which may be considered an error that can occur in the memory device 150), soft decision decoding may provide improved probability of correcting error and recovering data, as well as provide reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) code for soft decision decoding. The LDPC-CCs code may have a scheme using a linear time encoding and a pipeline decoding based on a variable block length and a shift register.

According to an embodiment, the ECC decoder may use, for example, a Log Likelihood Ratio Turbo Code (LLR-TC) for soft decision decoding. The Log Likelihood Ratio (LLR) may be calculated as a non-linear function for a distance between a sampled value and an ideal value. In addition, Turbo Code (TC) may include a simple code (for example, a Hamming code) in two or three dimensions, and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can not only detect power-on or power-off, but also can generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a type of working memory in the memory system 110 or the controller 130, while storing temporary or transactional data which occurred or is delivered for operations in the memory system 110 and the controller 130. For example, the memory 144 may temporarily store read data output from the memory device 150 in response to a request from the host 102, before the read data is output to the host 102. In addition, the controller 130 may temporarily store write data input from the host 102 in the memory 144, before programming the write data in the memory device 150. When the controller 130 controls operations such as data read, data write, data program, data erase, etc., of the memory device 150, a piece of data transmitted or generated between the controller 130 and the memory device 150 of the memory system 110 may be stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include a command queue, a program memory, a data memory, a write buffer/cache, a read buffer/cache, a data buffer/cache, a map buffer/cache, and/or the like. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. According to an embodiment, the processor 134 may be implemented with a microprocessor or a central processing unit (CPU).

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may be independent of a command or a request input from an external device such as the host 102. In one case, an operation performed by the controller 130 in response to the request or the command input from the host 102 may be considered a foreground operation, while an operation performed by the controller 130 independently (e.g., regardless of the request or the command input from the host 102) may be considered a background operation. The controller 130 can perform foreground or background operations for read, write or program, erase and the like, regarding a piece of data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WO, bad block management for identifying and processing bad blocks, or the like. The background operations may be performed in relation to a plurality of memory blocks 152, 154, 156 included in the memory device 150.

According an embodiment, substantially similar operations may be performed as both the foreground operation and the background operation. For example, when the memory system 110 performs garbage collection in response to a request or a command input from the host 102 (e.g., Manual GC), garbage collection can be considered a foreground operation. When the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 in order to improve performance of the memory system 110. For example, the transmitted requests or commands may be divided and processed in parallel within at least some of a plurality of planes, a plurality of dies or a plurality of chips included in the memory device 150. The memory interface 142 in the controller 130 may be connected to a plurality of planes, dies or chips in the memory device 150 through at least one channel and at least one way. When the controller 130 distributes and stores data in the plurality of dies through each channel or each way in response to requests or commands associated with a plurality of pages including non-volatile memory cells, plural operations corresponding to the requests or the commands can be performed individually or in parallel. Such a processing method or scheme can be considered an interleaving method. Because data input/output speed of the memory system 110 operating with the interleaving method may be faster than that without the interleaving method, data I/O performance of the memory system 110 can be improved.

By way of example but not limitation, the controller 130 can recognize statuses regarding a plurality of channels (or ways) associated with a plurality of memory dies included in the memory device 150. The controller 130 may determine the status of each channel or each way as one of, for example, a busy status, a ready status, an active status, an idle status, a normal status, and/or an abnormal status. The determination of which channel or way an instruction (and/or a data) is delivered through by the controller can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a set format or structure. For instance, the descriptors may include device descriptors, configuration descriptors, unit descriptors, and the like. The controller 130 can refer to, or use, the descriptors to determine which channel(s) or way(s) an instruction or a data is exchanged via.

Referring to FIG. 2, the memory device 150 in the memory system 110 may include the plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together. In an embodiment, each memory block 152, 154, 156 may have a three-dimensional stack structure for high integration. Further, the memory device 150 may include a plurality of dies, each die including a plurality of planes, each plane including the plurality of memory blocks 152, 154, 156. Configuration of the memory device 150 can be different for performance of the memory system 110.

In the memory device 150 shown in FIG. 2, the plurality of memory blocks 152, 154, 156 are included. The plurality of memory blocks 152, 154, 156 can be any of single-level cell (SLC) memory blocks, multi-level cell (MLC) Cell) memory blocks, or the like, according to the number of bits that can be stored or represented in one memory cell. An SLC memory block includes a plurality of pages implemented by memory cells, each storing one bit of data. An SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in view of storage capacity.

In an embodiment, the memory device 150 may be implemented with MLC memory blocks such as a double level cell (DLC) memory block, a triple-level cell (TLC) memory block, a quadruple-level cell (QLC) memory block and a combination thereof. The double-level cell (DLC) memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with a block including a plurality of pages Implemented by memory cells, each capable of storing five or more bits of data.

According to an embodiment, the controller 130 may use an MLC memory block included in the memory device 150 such as an SLC memory block that stores one-bit data in one memory cell. A data input/output speed of the MLC memory block can be slower than that of the SLC memory block. That is, when the MLC memory block is used as the SLC memory block, a margin for a read or program operation can be reduced. The controller 130 can utilize a faster data input/output speed of the MLC memory block when using the MLC memory block as the SLC memory block. For example, the controller 130 can use the MLC memory block as a buffer to temporarily store a puce of data, because the buffer may require a high data input/output speed for improving performance of the memory system 110.

Further, according to an embodiment, the controller 130 may program pieces of data in an MLC memory block a number of times without performing an erase operation on the MLC memory block included in the memory device 150. Non-volatile memory cells have a feature that does not support data overwrite. However, the controller 130 may use a feature in which an MLC may store mufti-bit data, in order to program plural pieces of 1-bit data in the MLC a number of times. For a MLC overwrite operation, the controller 130 may store the number of program times as separate operation information when a single piece of 1-bit data is programmed in a non-volatile memory cell. According to an embodiment, an operation for uniformly levelling threshold voltages of non-volatile memory cells can be carried out before another piece of data is overwritten in the same non-volatile memory cells.

In an embodiment, the memory device 150 is embodied as a non-volatile memory such as a flash memory, for example, as a NAND flash memory, a NOR flash memory, and the like. In an embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Referring to FIG. 3, a controller 130 in a memory system operates along with the host 102 and the memory device 150. As illustrated, the controller 130 includes a host interface 132, a flash translation layer (FTL) 240, as well as the memory interface 142, and the memory 144 previously identified in connection with FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in, or associated with, the controller 130.

The host interface 132 may be capable of handling commands, data, and the like transmitted from the host 102. By way of example but not limitation, the host interface 132 may include a corn land queue 56, a buffer manager 52, and an event queue 54. The command queue 56 may sequentially store commands, data, and the like, received from the host 102 and output them to the buffer manager 52, for example, in an order in which they are stored. The buffer manager 52 may classify, manage, or adjust the commands, the data, and the like, which are received from the command queue 56. The event queue 54 may sequentially transmit events for processing the commands, the data, and the like, received from the buffer manager 52.

A plurality of commands or data having the same characteristic (e.g., read or write commands) may be transmitted from the host 102, or plurality of commands and data having different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what type of internal operation the controller 130 will perform according to the characteristics of commands, data, and the like, which have been entered from the host 102. The host interface 132 can determine a processing order and a priority of commands, data and the like, based at least on their characteristics.

According to characteristics of commands, data, and the like transmitted from the host 102, the buffer manager 52 in the host interface 132 is configured to determine whether the buffer manager should store commands, data, and the like, in the memory 144, or whether the buffer manager should deliver the commands, the data, and the like into the flash translation layer (FTL) 240. The event queue 54 receives events, entered from the buffer manager 52, which are to be internally executed and processed by the memory system 110 or the controller 130 in response to the commands, the data, and the like, transmitted from the host 102, in order to deliver the events into the flash translation layer (FTL) 240 in the order received.

In accordance with an embodiment, the flash translation layer (FTL) 240 illustrated in FIG. 3 may implement a mufti-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44, to determine a physical address corresponding to the logical address which is entered with the events. The host request manager (HRM) 46 can send a read request with the physical address to the memory interface 142, to process the read request (handle the events). In an embodiment, the host request manager (HRM) 46 can send a program request (write request) to the block manager 48 to program data to a specific empty page (no data) in the memory device 150, and then can transmit a map update request corresponding to the program request to the map manager (MM) 44, in order to update an item relevant to the programmed data in information of mapping the logical-physical addresses to each other.

The block manager 48 can convert a program request delivered from the host request manager (HRM) 46, the map manager (MM) 44, and/or the state manager 42, into a flash program request used for the memory device 150 in order to manage flash blocks in the memory device 150. To maximize or enhance program or write performance of the memory system 110 (e.g., see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In an embodiment, the block manager 48 can be configured to manage blocks in the memory device 150 according to the number of valid pages, select and erase blocks having no valid pages when a free block is needed, and select a block including the least number of valid pages when it is determined that garbage collection is to be performed. The state manager 42 can perform garbage collection to move the valid data to an empty block and erase the blocks containing the moved valid data so that the block manager 48 may have enough free blocks (empty blocks with no data). When the block manager 48 provides information regarding a block to be erased to the state manager 42, the state manager 42 may check all flash pages of the block to be erased to determine whether each page is valid.

For example, to determine validity of each page, the state manager 42 can identify a logical address recorded in an out-of-band (00B) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process various requests, for example, queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a dean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the state manager 42 requests the map update in a state in which copying of valid page(s) is not completed normally, the map manager 44 might not perform the mapping table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
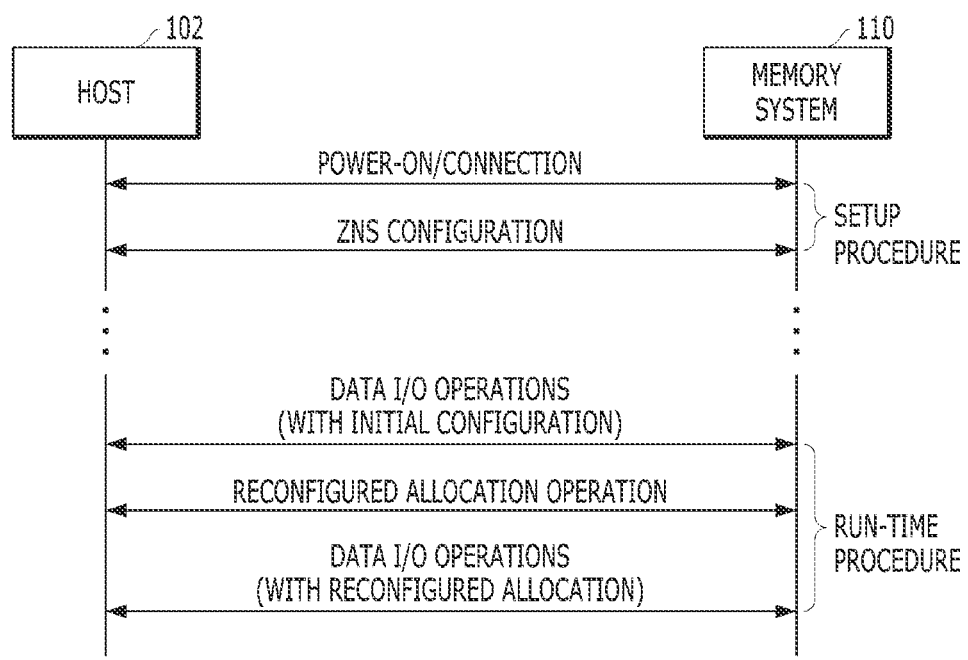
FIG. 4 illustrates a first example of a method for operating a data processing system including a host and a memory system.

FIG. 4 illustrates a first example of a method for operating a data processing system including a host and a memory system. Particularly, FIG. 4 shows how to set a ZNS by the host 102 and the memory system 110, and perform a data input/output operation based on the ZNS.

Referring to FIG. 4, during an initial setup procedure (SETUP PROCEDURE) after power is applied to the host 102 and the memory system 110, the host 102 and the memory system 110 can check whether the power is normally applied (POWER-ON/CONNECTION). The host 102 may recognize the memory system 110 and set a ZNS to store data in the memory system 110 or read the stored data from the memory system 110. The host 102 can transmit, to the memory system 110, information regarding the ZNS corresponding to a plurality of applications being executed therein. The memory system 110 can allocate a non-volatile memory block for the ZNS transmitted from the host 102 (ZNS CONFIGURATION).

After the initial setup procedure, the host 102 and the memory system 110 may perform an operation such as a data input/output operation corresponding to a user request (RUN-TIME PROCEDURE). After the memory system 110 allocates the non-volatile memory block for the ZNS transmitted from the host 102, the host 102 may execute an application in response to the user's request. When the application is executed, the host 102 can request data input/output of the memory system 110 based on the ZNS. For example, the host 102 can send a read request or a write/program request along with the ZNS to the memory system 110, and the memory system 110 can perform a data input/output operation corresponding to the read request or the write/program request (DATA I/O OPERATIONS WITH INITIAL CONFIGURATION).

While at least one data input/output operation has been performed or a data input/output operation is being performed, the host 102 or the memory system 110 may perform an operation of resetting a storage space associated with the ZNS (RECONFIGURED ALLOCATION OPERATION). For example, the operation of resetting the storage space associated with the ZNS may be performed through the first and second requests RES/RCS described in FIG. 1. In addition, in response to a characteristic of data generated by the host 102 or an operation state of the memory block in the memory system 110, the host 102 can send the first and second requests RES/RCS to the memory system 110. The number of bits of data stored in a non-volatile memory cell included in a memory block in the memory system 110 may be adjusted (increased or decreased).

According to an embodiment, in response to the first request RES, the memory system 110 can maintain a storage capacity corresponding to the ZNS used by the host 102 and deactivate another ZNS which is configured during the initial set procedure between the memory system 110 and the host 102 but not used after the initial set procedure, so that the memory system 110 can notify information of the reconfiguration to the host 102. In addition, in response to the second request RCS, the memory system 110 can maintain the storage capacity corresponding to the ZNS and activate the deactivated ZNS, so that the memory system 110 can notify information of the resetting to the host 102. In this case, the memory system 110 can read data from a plurality of memory blocks including a memory cell storing 1-bit data and re-program the read data in a single memory block including a memory cell storing mufti-bit data, so that the memory system 110 can secure available memory blocks allocated for the activated ZNS.

After the operation of resetting the storage space of the ZNS is performed, the host 102 may continue the data input/output operation through the ZNS. At this time, as a storage capacity of the ZNS is kept unchanged, an application can request input/output data of the memory system 110 in the same manner as before. However, when the memory system 110 deactivates at least one ZNS (e.g., release memory block allocation for the at least one ZNS), the host 102 may not use the ZNS deactivated by the memory system 110 (DATA I/O OPERATIONS WITH RECONFIGURED ALLOCATION).

Figure 5:
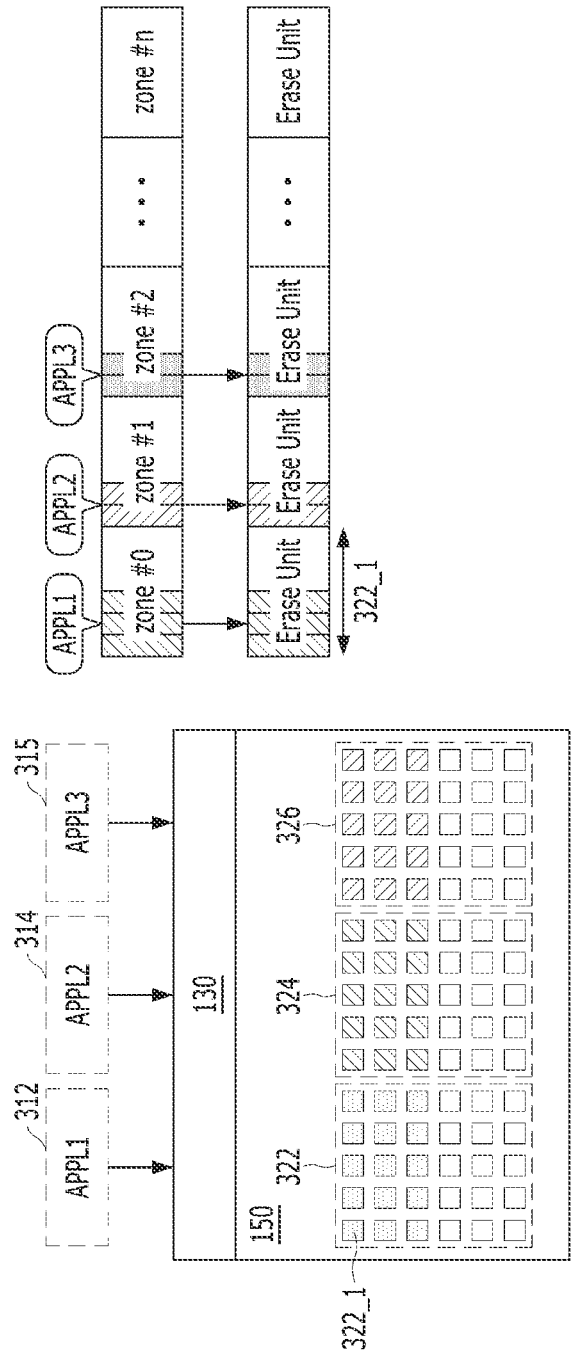
FIG. 5 illustrates a memory system including a non-volatile memory device supporting a namespace divided by plural zones.

FIG. 5 illustrates a memory system including a non-volatile memory device supporting a namespace divided by plural zones.

Referring to FIG. 5, a plurality of applications 312, 314, 316 (refer to FIGS. 1 to 4) can use ZNS to request data I/O operation of the controller 130. A plurality of memory blocks included in the memory device 150 may be allocated for each of three ZNSs 322, 324, 326.

A memory block 322_1 allocated for a first ZNS 322 will be described. Herein, the memory block 322_1 may be considered a group of memory cells which are erased together at a time by an erase operation. A first application (APPL1, 312) can use the first ZNS (322, zone #0). The ZNS can reduce influence which occurs from a difference between a logical address scheme used by the host 102 and a physical address scheme used in the memory device 150. The first application (APPL1, 312) may generate data and assign, to the data, a specific logical address in a range of logical addresses, assigned to the first ZNS (322, zone #0). Such data generated by the first application (APPL1, 312) may be sequentially stored in the memory block 322_1 allocated for the first applications (APPL1, 312).

Each of the plurality of applications 312, 314, 310 may use a designated or assigned ZNS among the plurality of ZNSs zone #0, zone #1, zone #3, zone #n. As described in FIG. 1, according to an embodiment, the plurality of ZNSs may be allocated for one application. According to an embodiment, the plurality of applications 312, 314, 316 may share a single ZNS. In a logical address scheme, different ranges of logical addresses can be assigned in advance to each of the plurality of ZNSs zone #0, zone #1, zone #3, zone #n, which individually corresponds to the plurality of applications 312, 314, 316. Each of the plurality of applications 312, 314, 316 might not use undesignated or unassigned ones of the plurality of ZNSs zone #0, zone #1, zone #3, zone #n. That is, a logical address pre-allocated to a specific ZNS may not be used by other applications using other ZNSs among the plurality of ZNSs zone #0, zone #1, zone #3, zone #n. When a ZNS is not shared by plural applications, this scheme of ZNS can avoid a phenomenon in which data generated by the plural applications may be mixed and jumbled in a single memory block, which is common in a conventional non-volatile memory device.

In a scheme using different addresses such as a logical address and a physical address, both a logical address and a physical address are sequentially assigned to data items generated by an application, thereby making it easier to perform garbage collection. According to an embodiment, the host 102 may change storage spaces allocated for the ZNSs zone #0, zone #1, zone #3, zone #n. At least some unallocated memory blocks in the memory device 150 may be additionally allocated to the ZNSs 322, 324, 326.

According to an embodiment, when all data stored in a specific ZNS is deleted or when the specific ZNS is not further used, the host 102 may notify it to the memory system 110. The memory system 110 may deactivate the specific ZNS according to a notification input from the host 102, perform an erase operation on memory blocks allocated for the specific ZNS, or initialize setting values for the memory blocks allocated for the specific ZNS. In response to a request input from the host 102, the memory system 110 can deactivate a specific ZNS in which no data is stored, or additionally allocate a memory block, which is not allocated for any ZNS, for the specific ZNS.

Figure 6:
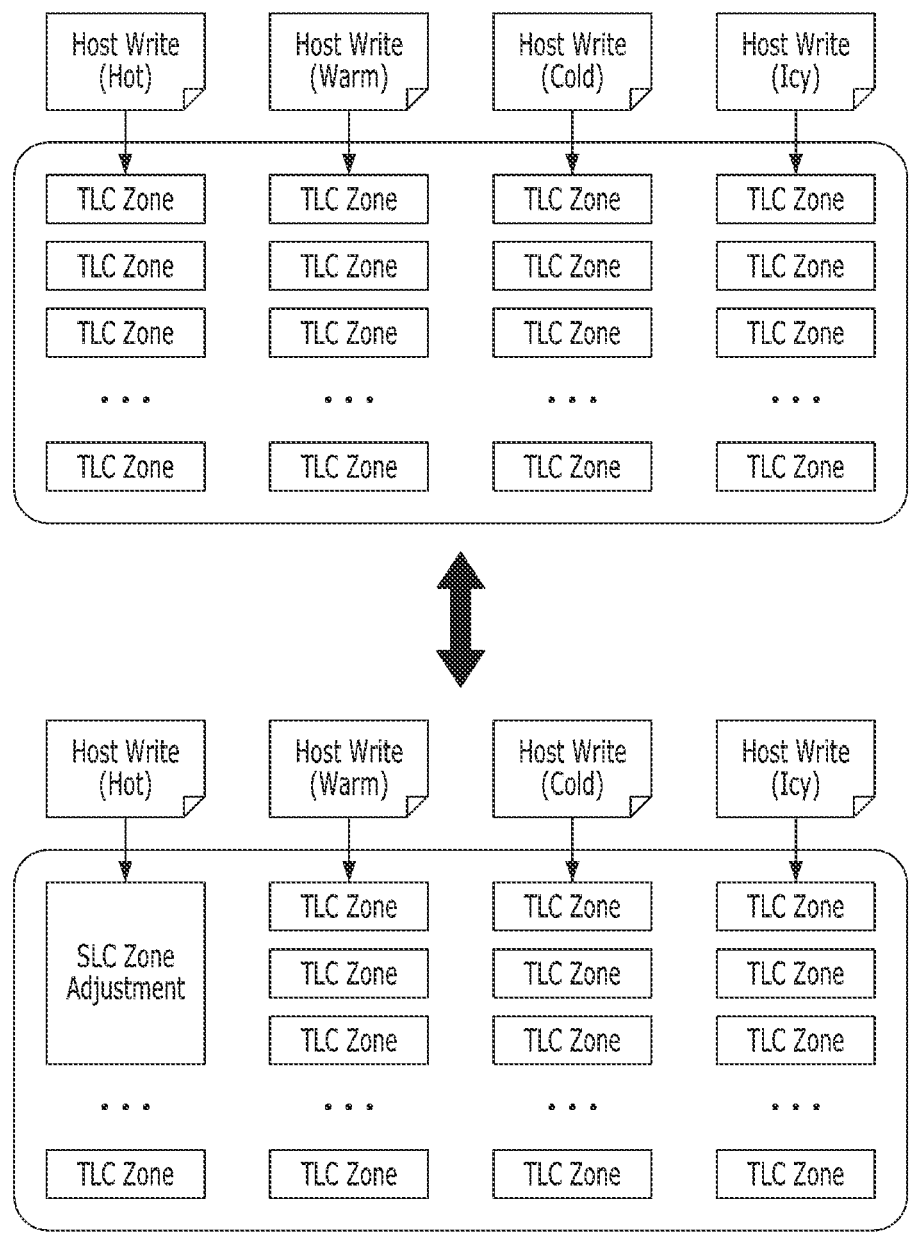
FIG. 6 illustrates a setting change of a storage space in the non-volatile memory device supporting the namespace divided by plural zones.

FIG. 6 illustrates a setting change of a storage space in the non-volatile memory device supporting the namespace divided by plural zones. In FIG. 6, in a memory system, a memory block allocated for a plurality of ZNSs can include a non-volatile memory cell (TLC) capable of storing 3-bit data as an example. In FIG. 6, a memory device including a non-volatile memory cell (TLC) capable of storing 3-bit data has been described as an example, but embodiments of the present disclosure are not limited thereto. For example, an embodiment can be applicable to a memory device including non-volatile memory cells, each non-volatile memory cell being capable of storing 2-bit data or 4-bit data.

Referring to FIG. 6, there may be some characteristics of data that the host stores in the memory system. For example, a data temperature of data may be determined according to an access frequency, an update frequency, and the like. Data can be classified into 4 types: hot, warm, cold, and icy. The access frequency of data decreases in an order of hot, warm, cold, and icy, and the update frequency of data may go down in the same order. The application executed by the host may transmit a request for programming data to the memory system in response to data temperature.

Because icy data is not frequently accessed or updated, the performance of the memory system might be not deteriorated even if the icy data is stored through a ZNS in a memory block including non-volatile memory cells (TLCs) capable of storing 3-bit data. On the other hand, because hot data can be accessed or updated frequently, a data input/output operation might not be performed fast in a case when the hot data is stored through the ZNS in the memory block including non-volatile memory cells (TLC) capable of storing 3-bit data. As the number of bits of data stored in the non-volatile memory cell increases, an operation of storing or reading data in or from the non-volatile memory cell can be performed more slowly. As the number of bits of data stored in the non-volatile memory cell decreases, the operation of storing or reading data in or from the non-volatile memory cell can be performed faster. To improve or enhance I/O performance of the memory system, the memory system 110 can adjust a memory block, which is allocated for a ZNS assigned to the hot data, to store 1-bit data instead of 3-bit data in non-volatile memory cells included in the memory block.

When the memory cells included in the memory block allocated for a specific ZNS assigned to the hot data is adjusted to store 1-bit data, not 3-bit data, a storage capacity of the specific ZNS might be practically reduced by a third. However, the memory system 110 can fix the storage capacity of the specific ZNS even if the number of bits of data is adjusted. To avoid a reduction in the storage capacity of the specific ZNS, the memory system can deactivate two other ZNSs corresponding to other memory blocks including non-volatile memory cells (TLC) capable of storing 3-bit data. That is, the memory system may also adjust memory cells to store 1-bit data within memory blocks of the two other ZNSs and incorporate the memory blocks from the two other ZNSs into the particular ZNS. Referring to FIG. 6, three TLC ZNSs associated with non-volatile memory cells TLC, each capable of storing 3-bit data, can be adjusted into one SLC ZNS associated with non-volatile memory cells SLC, each capable of storing 1-bit data. According to another embodiment, one SLC ZNS associated with non-volatile memory cells SLC, each capable of storing 1-bit data, can be adjusted into three TLC ZNSs associated with non-volatile memory cells TLC, each capable of storing 3-bit data.

Figure 7:
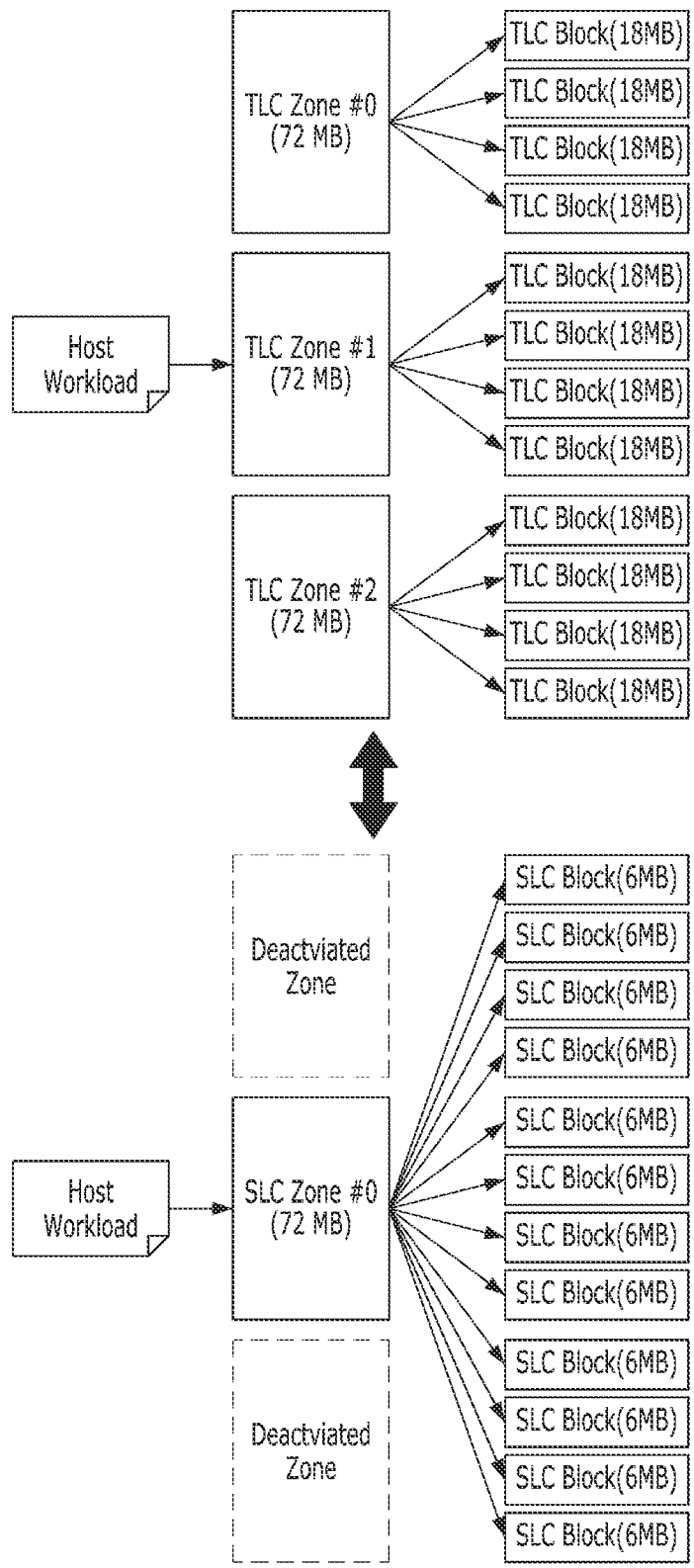
FIG. 7 illustrates a change in memory blocks according to a setting change of the storage space in the non-volatile memory device supporting the namespace divided by plural zones.

FIG. 7 illustrates a change in memory blocks according to a setting change of the storage space in the non-volatile memory device supporting the namespace divided by plural zones.

Referring to FIG. 7, a host workload including a data input/output operation input from a host is transmitted along with a ZNS associated with a non-volatile memory cell (TLC) capable of storing 3-bit data. Data can be stored in the memory system through first to third TLC ZNSs TLC Zone #0, TLC Zone #1, TLC Zone #2. For example, 72 MB storage capacity may be originally allocated for each of the first to third ZNSs TLC Zone #0, TLC Zone #1, TLC Zone #2. Four TLC memory blocks included in the memory device may be originally allocated for the first to third ZNSs TLC Zone #0, TLC Zone #1, TLC Zone #2. The TLC memory block can store 18 MB of data.

To speed up the data input/output operation requested by the host, the memory system can adjust a number of bits of data stored in a memory cell included in a memory block, which is allocated for a ZNS. Four memory blocks including TLCs each capable of storing 3-bit data can be originally allocated for the second ZNS TLC Zone #1 therefore having 72 MB storage capacity. As a result of the adjusting of the number of bits of data stored in a memory cell included in a memory block allocated for the second ZNS TLC Zone #1 of 72 MB storage capacity, the second ZNS TLC Zone #1 may become a fourth ZNS SLC Zone #0 having 4 SLC memory blocks, each capable of 6 MB data, and thus of 24 MB storage capacity. At this time, 8 number of TLC memory blocks originally allocated for the first and third ZNSs TLC Zone #0 and TLC Zone #2 may also be adjusted to SLC memory blocks and may be incorporated into the fourth ZNS SLC Zone #0. Now, the fourth ZNS SLC Zone #0 may have 12 number of SLC memory blocks and thus may be of 72 MB storage capacity, which stays the same as the original storage capacity. Because the 8 number of TLC memory blocks originally allocated for the first and third ZNSs TLC Zone #0, TLC Zone #2 are re-allocated (i.e., adjusted to SLC memory blocks and incorporated) for the fourth ZNS SLC Zone #0, the first and third ZNSs TLC Zone #0, TLC Zone #2 may be deactivated.

Figure 8:
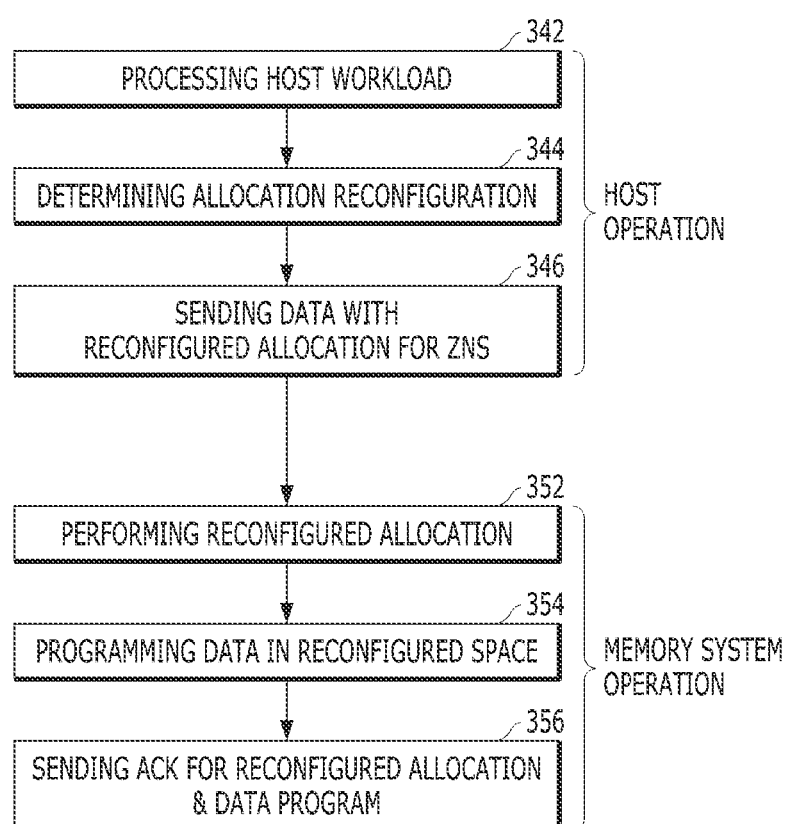
FIG. 8 illustrates a second example of the method for operating the data processing system including the host and the memory system.

According to an embodiment, the fourth ZNS SLC Zone #0 having SLC memory blocks may be adjusted back to the first to third ZNS TLC Zone #0, TLC Zone #1, TLC Zone #2 having TLC memory blocks without change to the original storage capacity. In this case, the SLC memory block is adjusted back to a TLC memory block, and the 12 TLC memory blocks are allocated four each to the first to third ZNSs TLC Zone #0, TLC Zone #1, TLC Zone #2. Through this operation, the deactivated first and third TLC ZNSs TLC Zone #0, TLC Zone #2 can be activated for a data input/output operation, FIG. 8 illustrates a second example of the method for operating the data processing system including the host and the memory system. The method of operating the data processing system illustrated in FIG. 8 is a reconfiguration procedure between the host 102 and the memory system 110, so as to change or adjust a storage space of the ZNS.

Referring to FIG. 8, the host may perform a host workload corresponding to a user request (342). The host workload may include an operation for storing data, generated by an application executed by a host, to a memory system or reading data stored from the memory system. The host may determine whether to re-configure ZNSs based on a characteristic of data, a priority of data, a data input/output speed required by an application, an operation state of the memory device, and the like (344). The host may transmit data to the memory system with re-configuration information regarding the ZNSs (346). Referring to FIG. 1, the first and second requests RES/RCS, transmitted by the host 102 to the memory system 110, can be understood as an example for re-configuration regarding the ZNSs.

Before programming data, the memory system may perform a reconfiguration for the ZNSs, based on a request which is input from the host (352). After reconfiguring the ZNSs, the memory system may program data in a location corresponding to the reconfigured ZNS (354). After the ZNS is reconfigured and the data are programmed, the memory system may transmit to the host a response ACK regarding the reconfiguration and data program (356).

Although not shown, according to an embodiment, even after the reconfiguration for the ZNSs requested from the host and the program of data according to the reconfigured ZNSs are successfully completed, the memory system may reset or reconfigure the ZNSs in response to another host's request. For example, the reconfiguration of the ZNSs may be performed during an initial procedure after the host and the memory system are powered on and coupled with each other. Further, as described in FIG. 4, even after the host and the memory system perform data input/output operations for a certain period of time, the reconfiguration of the ZNSs can be performed in response to a user's request or host's request. When the data program is completed according to the reconfiguration for the ZNSs, the memory system can perform an operation corresponding to the host request, so that the ZNSs can be reconfigured or reset. For reconfiguration, the memory system can initialize settings regarding the ZNSs or the memory blocks corresponding to the ZNS, in response to the host request.

As above described, a memory system or a data processing system according to an embodiment of the present disclosure may utilize a non-volatile memory device that supports a namespace divided by plural zones, each zone corresponding to characteristics of data.

Further, the memory system according to another embodiment of the present disclosure may increase a lifespan of the non-volatile memory device supporting the namespace divided by the plural zones.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
   a memory device including a plurality of memory blocks, each memory block including memory cells capable of storing multi-bit data; and
   a controller configured to allocate the plurality of memory blocks for plural zoned namespaces input from an external device and access a memory block allocated for one of the plural zoned namespaces in response to a data input/output request input from the external device,
   wherein, in response to a first request input from the external device, the controller adjusts a number of bits of data stored in a memory cell included in a memory block which is allocated for at least one zoned namespace among the plural zoned namespaces,
   wherein the controller is configured to, when memory blocks allocated for the at least one zoned namespace include memory cells storing n-bit data before the first request is input, adjust the memory blocks to store 1-bit data in each of the memory cells included therein and deactivate (n−1) zoned namespaces among the plural zoned namespaces to maintain a storage capacity of the at least one zoned namespace, wherein the n is an integer greater than 1.

2. The memory system according to claim 1, wherein the controller is configured to, when the first request is input along with a specific zoned namespace among the plural zoned namespaces, adjust at least one memory block allocated for the specific zoned namespace to store 1-bit data in each of memory cells in the at least one memory block and deactivate at least one zoned namespace other than the specific zoned namespace among the plural zoned namespaces to maintain the storage capacity of the specific zoned namespace.

3. The memory system according to claim 2, wherein the controller is further configured to, in response to a second request input from the external device, adjust the at least one memory block storing the 1-bit data in each of memory cells to store the multi-bit data therein.

4. The memory system according to claim 3, wherein the controller is configured to, in response to the second request, activate the at least one zoned namespace previously deactivated to store data.

5. The memory system according to claim 1, wherein the first request is associated with a characteristic of data stored in the memory device via the at least one zoned namespace of the plural zoned namespaces.

6. The memory system according to claim 5, wherein the first request is associated with a memory block storing data which has a shorter update period than, or is more frequently read than, other data stored in other memory blocks allocated for other zoned namespaces.

7. The memory system according to claim 1, wherein the controller is further configured to perform garbage collection to at least one memory block among the plurality of memory blocks and release zoned namespace allocation of the at least one memory block when the at least one memory block is erased.

8. The memory system according to claim 1, wherein the controller is further configured to transmit, to the external device, a result of the adjusting of the number of bits of data stored in the memory cell included in the memory block allocated for the at least one zoned namespace.

9. A method for operating a memory system, comprising:
allocating a plurality of memory blocks, each memory block including memory cells capable of storing multi-bit data, for plural zoned namespaces input from an external device;
accessing a memory block allocated for one of the plural zoned namespaces in response to a data input/output request input from the external device; and
adjusting a number of bits of data stored in a memory cell included in a memory block, which is allocated for at least one zoned namespace among the plural zoned namespaces in response to a first request input from the external device,
wherein the adjusting of the number of bits of data comprises when the memory block allocated for the at least one zoned namespace includes memory cells storing n-bit data before the first request is input:
adjusting the memory block to store 1-bit data in each of the memory cells included therein; and
deactivating (n−1) zoned namespaces among the plural zoned namespaces, wherein the n is an integer greater than 1 to maintain a storage capacity of the at least one zoned namespace.

10. The method according to claim 9, wherein the adjusting of the number of bits of data comprises when the first request is input along with a specific zoned namespace among the plural zoned namespaces:
adjusting at least one memory block allocated for the specific zoned namespace to store 1-bit data in each of memory cells in the at least one memory block; and
deactivating at least one zoned namespace other than the specific zoned namespace among the plural zoned namespaces to maintain the storage capacity of the specific zoned namespace.

11. The method according to claim 10, further comprising adjusting, in response to a second request input from the external device, the at least one memory block storing the 1-bit data in each of memory cells to store the multi-bit data therein.

12. The method according to claim 11, further comprising activating, in response to the second request, the at least one zoned namespace previously deactivated to store data.

13. The method according to claim 9, wherein the first request is associated with a characteristic of data stored in the memory device via the at least one zoned namespace of the plural zoned namespaces.

14. The method according to claim 13, wherein the first request is associated with a memory block storing data which has a shorter update period than, or is more frequently read than, other data stored in other memory blocks allocated for other zoned namespaces.

15. The method according to claim 9, further comprising:
performing garbage collection to at least one memory block among the plurality of memory blocks; and
releasing zoned namespace allocation of the at least one memory block when the at least one memory block is erased.

16. The method according to claim 9, further comprising transmitting, to the external device, a result of the adjusting of the number of bits of data stored in the memory cell included in the memory block allocated for the at least one zoned namespace.

17. A memory system, comprising:
a memory device including a plurality of memory blocks, each memory block including memory cells capable of storing multi-bit data; and
a controller configured to:
allocate the plurality of memory blocks for plural zoned namespaces input from an external device,
access a memory block allocated for one of the plural zoned namespaces in response to a data input/output request input from the external device,
adjust, in response to a first request, a number of bits of data stored in a memory cell included in a memory block, which is allocated for at least one zoned namespace among the plural zoned namespaces, and
deactivate at least one zoned namespace other than the at least one zoned namespace among the plural zoned namespaces to maintain the storage capacity of the at least one zoned namespace corresponding to the first request.

18. The memory system according to claim 17, wherein the controller is further configured to perform garbage collection to at least one memory block among the plurality of memory blocks and release zoned namespace allocation of the at least one memory block when the at least one memory block is erased.

* * * * *